Patented Oct. 17, 1922.

1,432,686

UNITED STATES PATENT OFFICE.

GEORGE GRINDROD, OF KENT, WASHINGTON, ASSIGNOR TO CARNATION MILK PRODUCTS COMPANY, OF CHICAGO, ILLINOIS, A CORPORATION OF DELAWARE.

MANUFACTURE OF EVAPORATED MILK OR EVAPORATED-MILK COMPOUNDS.

No Drawing.      Application filed February 25, 1918.  Serial No. 218,934.

*To all whom it may concern:*

Be it known that I, GEORGE GRINDROD, a citizen of the United States, and residing in the city of Kent, county of King, and State of Washington, have invented certain new and useful Improvements in the Manufacture of Evaporated Milk or Evaporated-Milk Compounds, of which the following is a description.

In the treatment of certain evaporated milks or condensed milks, or milk compounds, I have found it advantageous to bring about as great a subdivision of the fat as possible, either the original butter fat or the substituted fat, and particularly at the greatest saving in expense of power as possible.

In the use of homogenizers, another element of power expense is required to be considered, and especially so when the pressures of the homogenizers exceed three thousand pounds per square inch, as the power and time become excessive at such excessive pressures. When such excessive pressures are used, I have also found that the casein molecules began to crack into albuminoids, and when this is the case, I have found that the ability to withstand sterilization without coagulation of the milk is lowered.

In my process, by utilizing a small or minor portion to begin with, and emulsifying this minor portion, extreme homogenizing pressures can be used. On account of the small bulk of the material to be homogenized, power cost and time are small. Cracking of the casein does not have to be avoided, but a considerable amount of cracking of casein molecules is desirable, since that increases the amount of coagulable protein. Since this cracking of casein molecules into coagulable albuminoids is not carried out in all of the milk, but only in a small portion of it, the increase in proportion of the coagulable protein in the entire product after mixing the emulsion into the major portion of the milk is not large enough to materially affect the sterilizing quality of the milk. Thus, any desired degree of homogenization can be used without injuring the milk, and with an expenditure of power less than that now used.

From this portion of my invention, it will be seen that I take a small or minor amount of milk, condense it to the point of maximum hydration of the colloids, after forewarming it to a temperature just under the coagulation point of albumin, and then homogenize it with such pressures as will give it any desired degree of subdivision of the fat. By point of maximum hydration above referred to is meant that condition where the colloid or protein has absorbed the maximum quantity of water which it is capable of absorbing. Proteins, such as casein, are capable of absorbing water which causes them to swell, and within a certain limit, they combine all of this water by the process of adsorption, leaving no free water. At this point the colloid is sticky and stringy. Exact tests for determining the point of maximum hydration are not yet available, but in general, this point is indicated by the greatest tendency of the colloid to become attenuated or stringy. The colloid in this condition has the consistency of glue. After it is further diluted, it begins to lose its tenacity and at the same time loses its power of emulsification. The proportion of the small or minor emulsion in relation to the whole of the product is not necessarily definite, and may be generally stated as consisting of less than one-half of the total volume of milk, and when condensed as specified, is approximately one-third of the bulk of the material. The emulsion is then raised to a temperature above the coagulation point of the albumin with a minimum of agitation, and then cooled. The albumin is thus caused to coagulate around the comminuted fat globules producing a permanent emulsion. The required weight of this emulsion is then weighed into a major or dominant portion of warm condensed milk from the vacuum pans, and both mixtures thus mixed are then cooled, and thereafter canned and sterilized. It will be seen that the bulk of the milk does not need to go through the homogenizer. This addition of the minor portion or the addition of the complete emulsion thus deliberately formed, serves to act as a nuclei portion, whereby the albumin in the major portion of the milk may find nuclei on which to coagulate, and with the growth or body building thus produced, the entire mixture will take on the character of a complete emulsion, which will be aided by sterilization, but which will not require sterilization to that degree used in present processes to insure such a permanent emulsion, since the permanent character of stability of the emulsion is already formed before sterilization, the sterilization, however, increasing the stability of the emulsion.

I have just described my invention as applicable to milk,—that is, whole milk,—subject to evaporation, and intended to be permanently emulsified, but it is clear that the invention is applicable in other processes used for the making of a compound of skimmed milk and a substituted fat. In such processes for the making of such compound, I take a comparatively small portion of skimmed milk forming the minor portion, which I condense to the point of maximum hydration of the colloids, or to that point where it has a gluey consistency and great tenacity after forewarming to a temperature just under the coagulation point of albumin, adding the fat before this condensation or after this condensation, and then I homogenize with a large quantity of fat, using sufficient pressure to give any desired degree of subdivision of the added or substituted fat, as also such butter fat as may remain in the skimmed milk after partial or substantially entire extraction of butter fat. The resulting emulsion is then raised to a temperature above the coagulation point of albumin without excessive agitation. As just stated, after homogenization of the minor portion, the temperature of the emulsion is raised preferably with a minimum of agitation, to a point above the coagulation point of albumin, that is 95° to 100° C. This causes the albumin to coagulate around the fat globules; and, on account of the (1) small size of globules, (2) the great number per unit of space, and (3) the density of the colloid, none of the albumin can coagulate from nuclei other than the fat globules. But the fat globules furnish sufficient nuclei, so that all coagulation is from the fat globules as nuclei. The coagulation of the albumin is on these comminuted fat globules, and these fat globules with the coagulated albumin form the nuclei in the later stages. This minor portion is then cooled by cooling coils, etc., to prevent bacterial growth, if desired to be used at some time thereafter, but if desired to be used immediately, such cooling is not necessary. Thereupon the required weight of this prepared emulsion, or minor portion, is then weighed into the warm condensed skimmed milk from the vacuum pans, which forms the major portion, the albumin of this major portion may or may not be coagulated, and is mixed therewith and the entire quantity, both the major and minor portions, is mixed and is then cooled. After this cooling, the product is canned and sterilized and, as before stated, the sterilization temperature need not be carried on to the degree heretofore used to insure the permanency of the emulsion, since the emulsion is already formed, due to the body building already described. It will be noted that the bulk of the skimmed milk of the major portion does not go through the homogenizers.

Furthermore, in the present process, complete entanglement of the comminuted fat with the coagulated albumin is secured before sterilizing. Moreover, emulsification clots once formed are not broken by any subsequent homogenizing since this step is already accomplished, but remain as coagulation centers for body formation in the sterilizers. My process does not break up any coagulation and all globules go to the sterilizers as centers of albumin coagulations, on which in the sterilization the other albumin and casein is deposited. The sterilized product is a permanent and satisfactory emulsion. Permanency of the emulsion in the finished product may be viewed as affected by body formation or continued clot building which takes place in sterilizing. In my process, there are no large fat globules, and all the very finely divided fat globules are already nuclei of albumin coagulation, so that the end result after sterilizing is a product in which there are no free fat globules.

For these reasons, there can be no cream separation, on account of the permanency and uniformity of the emulsion produced according to the above method.

Furthermore, the flavor of the product is improved. Moreover, the stability of the product in hot climates is increased, as also its stability against coagulation in coffee.

In the manufacture of lactose, in which albumin and casein are obtained as by-products, these by-products could be recovered and then hydrated and utilized as emulsifying agents, by adding them in the minor portion, thereby saving condensation of additional milk corresponding to such addition of albumin or casein.

As a second part of my inventions, I contemplate the combination of these inventions as hereinabove described, together with the inventions described by me, utilizing dialysis, for which an application for United States Letters Patent was filed by me on the 7th day of January, 1918, under Serial No. 210,798. This latter consists essentially and briefly in the removal in whole milk or skimmed cow's milk of part of the inorganic salts or the protein decomposition producing constituents or the non-colloidal constituents other than lactose either by dialysis or otherwise, and then utilizing such milk,— either whole milk or skimmed milk, of the cow or other origin,—with such constituents removed in the same manner as if those constituents were not removed. Of course, its removal might take place before, during, or after condensation, should condensation be desired. The process may also be applied in the manufacture of evaporated whole milk, by first separating the cream and subjecting it to the process as described, and the adding it to the major portion. One embodiment of the process consists in the taking of a minor portion of the skimmed milk, condensing this to the point of maximum hydration, then adding the cream, then homogenizing and coagulating, and adding this to the major portion.

Having thus described my invention, what I claim as new, and desired to secure by Letters Patent:

1. The process of making evaporated milk, which consists in separating the cream from the milk, forewarming a minor amount of the skimmed milk at a temperature below the coagulating point of albumen, evaporating said minor amount of the skimmed milk to the point of maximum hydration of the colloids, then homogenizing said evaporated milk with the cream taken from the milk, then coagulating the albumen in said evaporated milk, then evaporating the major portion of the skimmed milk, then adding the minor portion of the evaporated milk to the evaporated major portion of the milk, and cooling the mixture.

2. The process of making evaporated milk, which consists in forewarming a minor amount of the milk to be condensed to a temperature just under the coagulation point of albumin, then condensing said minor amount to the point of maximum hydration of the colloids, and then homogenizing said minor amount, adding said evaporated minor amount to the evaporated major amount of evaporated or condensed milk and then mixing the major and minor amounts.

3. The process of making evaporated milk, which consists in separating the cream from the milk, condensing a small or minor amount of the skimmed milk to the point of maximum hydration of the colloids, maintaining at all times a temperature below the coagulation point of albumin, and then homogenizing said condensed or evaporated milk with the cream, coagulating the albumin in said minor amount, condensing said major amount, adding said minor amount of condensed and coagulated albumin milk to the major portion of the milk, then mixing the minor and major portions, canning and sterilizing the same.

4. A process of making evaporated milk which consists in forewarming a small or minor amount of skimmed milk at a temperature under the coagulating point of albumen, then condensing said minor amount to the point of maximum hydration of the colloids and then homogenizing said minor condensed amount, condensing the major amount of skimmed milk, and then adding the condensed minor amount to the condensed major amount and mixing the same, then cooling, canning and sterilizing the same.

In testimony that I claim the foregoing as my invention I have signed my name in presence of a witness.

GEORGE GRINDROD.

Witness:
H. B. MADISON.